US009854170B2

United States Patent
Katz et al.

(10) Patent No.: US 9,854,170 B2
(45) Date of Patent: Dec. 26, 2017

(54) ROLLING SHUTTER BLUR REDUCTION USING MOTION DATA

(71) Applicant: Oculus VR, LLC, Menlo Park, CA (US)

(72) Inventors: Dov Katz, Irvine, CA (US); Simon Hallam, San Jose, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 14/983,430

(22) Filed: Dec. 29, 2015

(65) Prior Publication Data

US 2017/0187961 A1    Jun. 29, 2017

(51) Int. Cl.
*H04N 5/232*    (2006.01)

(52) U.S. Cl.
CPC ..... *H04N 5/23267* (2013.01); *H04N 5/23258* (2013.01)

(58) Field of Classification Search
CPC ............. H04N 5/23267; H04N 5/3532; H04N 5/23258
See application file for complete search history.

(56) References Cited

U.S. PATENT DOCUMENTS

| 8,786,716 | B2 | 7/2014 | Zhou | |
|---|---|---|---|---|
| 2009/0160957 | A1* | 6/2009 | Deng | G06T 7/238 348/208.99 |
| 2009/0201383 | A1* | 8/2009 | Slavin | H04N 5/23248 348/222.1 |
| 2013/0265460 | A1* | 10/2013 | Wu | H04N 5/2329 348/222.1 |
| 2014/0218569 | A1* | 8/2014 | Tsubaki | H04N 5/2329 348/241 |

\* cited by examiner

*Primary Examiner* — Gevell Selby
(74) *Attorney, Agent, or Firm* — Fenwick & West LLP (57) ABSTRACT

Embodiments relate to adjusting an image frame based on motion sensor data. An image frame including image data for a plurality of rows of the image frame is captured sequentially row-by-row. Motion sensor data corresponding to the image frame is also captured. Motion vectors describing motion between each row of the image frame are determined based on the motion sensor data. An image data translation is calculated for each row of image frame based on the motion vector for the row. The image frame is adjusted based on the image data translation for each row of the image frame to generate an adjusted image frame.

18 Claims, 7 Drawing Sheets

ROLLING SHUTTER BLUR REDUCTION USING MOTION DATA

BACKGROUND

1. Field of the Disclosure

This disclosure pertains in general to image processing, and more specifically to adjusting image data to reduce distortion from rolling shutter image capture.

2. Description of the Related Art

An image capturing device, such as a camera, may capture an image frame at a single moment, or may capture an image frame with a "rolling shutter" that captures sequential lines of the image frame. The image frame includes image data for a plurality of rows. An image capturing device using the rolling shutter method captures the image data of the image frame one row (or column) at a time. In other words, image data for each row is captured at a different instant in time. Thus, the image capturing device does not capture the image data of the image frame at one instant in time.

Image distortion can be introduced in the image frame and can be apparent when the image frame is rendered or otherwise displayed. The image distortion can be introduced, for example, by movement of the image capturing device while the image frame is being captured. For example, if the image capturing device heaves (i.e., moves up or down) while the image capturing device is capturing the image frame, the image frame can appear to be stretched or compressed. While in many applications this may not be a concern, for high-fidelity use of image frames or use of image frames for a computer vision or computer modeling (i.e., of a 3D world), these effects may make it difficult for a computer to reconcile the different image frames that have distortions due to the image capturing device using the rolling shutter method.

SUMMARY

Embodiments relate to adjusting an image frame based on motion sensor data describing motion of the capture device during capture of the image frame. An image frame including image data for a plurality of rows of the image frame is captured sequentially row-by-row. Motion sensor data corresponding to the image frame is also captured describing movement of the device during capture. Motion vectors describing motion between each row of the image frame are determined based on the motion sensor data. An image data translation is calculated for each row of the image frame based on the motion vector for the row. The image frame is adjusted based on the image data translation for each row of the image frame to generate an adjusted image frame. The adjusted image frame may have a different size than the original image frame (e.g., because rows were adjusted outside the original image frame), or the adjusted image frame may maintain the original size, in which case image data outside the original frame may be excised. After translating the image data, there may be gaps in the original frame due to the row translation. These gaps may be left, or the gaps may be filled by a variety of methods, such as by inserting data from a previous frame corresponding to that location or by filling the gap with image data of surrounding rows or pixels. Among other uses, the translation of the image frame that accounts for the camera movement may be used to improve perception of a computer model.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that can be employed without departing from the principles discussed herein. Reference will now be made in detail to several embodiments, examples of which are illustrated in the accompanying figures.

An image capture device captures an image frame, the image frame including image data for each pixel of the image frame. The image capture device implements an analog-to-digital converter to capture the image data. An image frame capture rate is the rate at which the image capture device captures the image frame. The image capture device can operate according to a global shutter (GS) method or a rolling shutter (RS) method.

An image capture device operating according to the GS method captures an image frame at one instant in time. Specifically, the image capture device captures image data for the entire image frame at one instant in time. The amount of data converted by an analog-to-digital converter of the image capture device corresponds to a total number of pixels of the image frame. The image frame capture rate is directly related to the amount of data the analog-to-digital convert converts.

An image capture device operating according to the RS method captures an image frame over a period of time. Specifically, the image capture device captures image data of the image frame sequentially one row at a time. In other words, the image capture device captures image data for a first row, then a second row, and the remaining subsequent rows until the entire image frame is captured. The amount of data in the RS method converted by an analog-to-digital converter of the image capture device corresponds to a total number of pixels in a single row.

Thus, the amount of data converted by the analog-to-digital converter of the image capture device operating according to the RS method is less than the amount of data converted by the analog-to-digital converter of the image capture device operating according to the GS method. The image capture device operating according to the RS method results in a higher image frame capture rate than compared to the image capture device operating according to the GS method.

Furthermore, the image capture device operating according to the RS method has lower production cost and lower power consumption than compared to the image capture device operating according to the GS method. However, operating the image capture device according to the RS method can introduce image distortion in the image frame and the image distortion can be apparent when the image frame is rendered or otherwise displayed. The image distortion can be introduced by movement of the image capture device during capturing of the image frame. To correct the image distortion, motion sensor data describing motion of the image capturing device during the capturing of the image frame can be used to adjust the image frame to correct the unwanted distortion.

The image capturing device can be a component of a virtual reality headset. The virtual reality headset further includes a virtual reality machine and a display. The virtual reality machine receives image frames captured by the image capturing device and creates a virtual reality environment including data derived from the image frames. The virtual reality environment can be, for example, an augmented reality environment or virtual representation of the real world. In creating the augmented reality environment, the virtual reality machine augments elements of a physical, real-world environment as captured in the image frames with elements generated by the virtual reality machine. The virtual reality machine renders the virtual reality environment and sends the rendering to the display. To determine the virtual reality environment, the virtual reality machine may use a simultaneous localization and mapping (SLAM) system for converting image frames into virtual reality environment representations.

As previously described, movement of the image capturing device can introduce image distortions in the image frames. If the image frames include image distortions, the virtual reality environment, and rendering thereof, may also include the image distortions and make it more challenging for the virtual reality environment to merge the new image data into the existing concept of the virtual reality environment. Image distortions in the virtual reality environment can thus lead to an undesirable virtual reality experience when and if errors due to the distortions appear. Correcting the image distortions by adjusting the image frames at the image capturing device, and creating the virtual reality environment at the virtual reality machine including the adjusted image frames provides a virtual reality experience can account for movement of the image capturing device. The virtual reality machine provides one example environment for applying the image adjustment techniques disclosed herein, and these techniques may be applied to other contexts.

I. Configuration Overview

Figure 1:
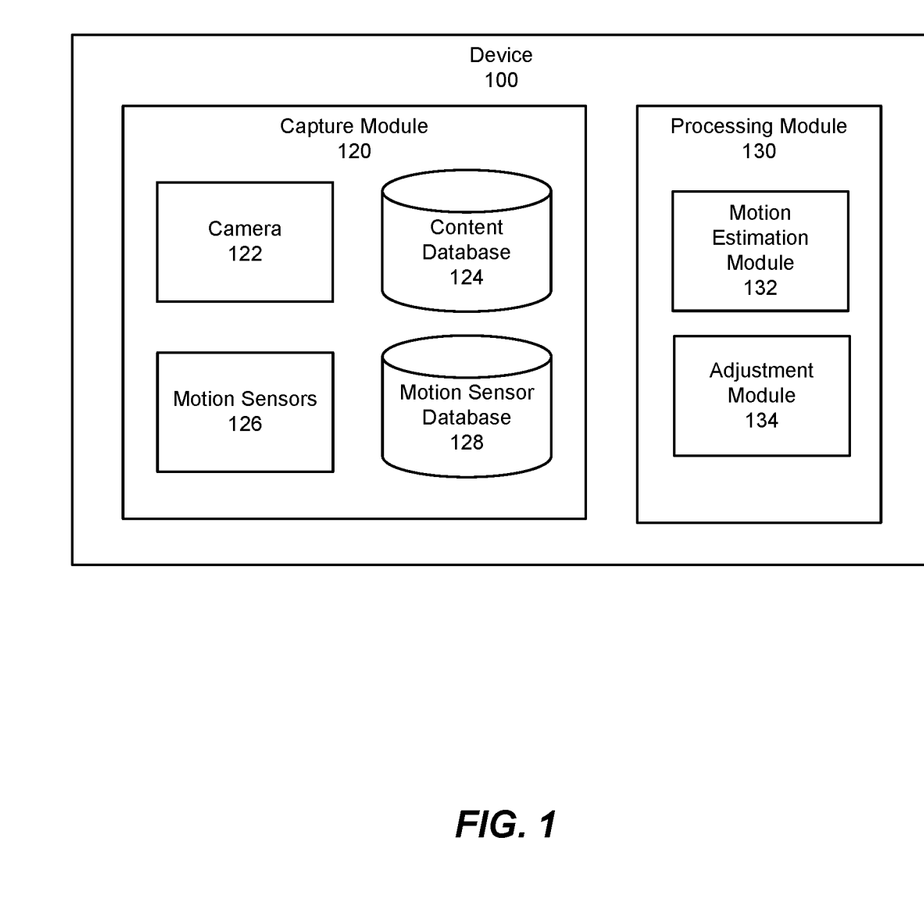
FIG. 1 is a block diagram illustrating a device for adjusting an image frame based on motion sensor data, according to one embodiment.

FIG. 1 is a block diagram illustrating a device 100 for adjusting an image frame based on motion sensor data describing motion of the device 100 during capture of the image frame, according to one embodiment. The device 100 includes a capture module 120 and a processing module 130. The device 100 can be any device capable of capturing images, such as a standalone digital camera, smart phone, a tablet computer, or any other suitable user device or computing device. The device 100 captures an image frame and motion sensor data and adjusts the image frame based on the motion sensor data to generate an adjusted image frame. The device 100 can be an input to a virtual reality machine to generate a virtual reality environment including data derived from the adjusted image frame. The device 100 includes a processor and a non-transitory computer-readable storage medium storing executable instructions that, when executed by the processor, perform the functionalities described herein.

IA. Capture Module

The capture module 120 captures an image frame and motion sensor data, stores the captured image frame and motion sensor data, and provides the stored data to the processing module 130 for processing. The capture module 120 includes a camera 122, a content database 124, motion sensors 126, and a motion sensor database 128.

The camera 122 captures the image frame and transmits the captured image frame to the content database 124. The camera 122 can include, among other components, an image sensor and an analog-to-digital converter. The image sensor of the camera 122 can use any image capture sensor, such as complementary metal-oxide semiconductor (CMOS) technology.

The camera 122 captures the image frame over a period of time. Specifically, the camera 122 captures image data of the image frame sequentially one row, or one column, at a time. Alternatively, the camera 122 captures image data of the image frame several rows, or several columns, at a time. Each row, or column, of captured data can have a height, or respectively a width, of one or more pixels. The camera 122 can capture image data of the image frame sequentially from top to bottom, from bottom to top, from left to right or from right to left. For simplicity, but without loss of generality, the description relates to the camera 122 capturing the image data of the image frame sequentially one row at a time from top to bottom. A height of the image frame is the number of rows of the image frame. The camera 122 may also capture a sequence of image frames in a series to form a stream of the image frames.

The camera 122 provides a timestamp when the camera 122 begins capturing image data for each row of the image frame as well as when the camera 122 completes capturing image data for a last row of the image frame. The timestamps can be incorporated in the image data for each row of the image frame. Alternatively, the camera 122 provides a timestamp indicating a time the camera 122 begins capturing image data for a first row of the image frame. The camera 122 captures image data for each row of the image frame at a fixed rate. The fixed rate can be divided by the number of rows to calculate a lapsed time to capture each row of the image frame. The timestamp can be incorporated in the image data for the first row of the image frame.

Moving the device 100 while the camera 122 captures the image data of the image frame one row at a time can cause distortion in the image frame. The distortion can be captured in the image data of the image frame and can be apparent when the image frame is rendered or otherwise displayed or interpreted by a user of the device 100 or another device or module. For example, if the device 100 moves up while the camera 122 captures image the data of the image frame one row at a time from top to bottom, a rendering of the image frame may result in smeared image data.

Movement of the device 100 can be described as translational, rotational, or a combination thereof. Translational movement can include heaving (i.e., moving up and down), swaying (i.e., moving left and right), and surging (i.e., moving forward and backward). Rotational movement can include pitching (i.e., tilting forward and backward), yawing (i.e., turning left and right), and rolling (i.e., tilting side to side). For simplicity, but without loss of generality, the present description relates to the device 100 heaving during the capturing of the image data for the image frame.

In one embodiment, the camera 122 transmits image data for all the rows of the image frame to the content database 124 at one instant in time. For example, the camera 122 transmits the image data for all the rows of the image frame after the image data for a last row of the image frame is captured. In another embodiment, the camera 122 transmits image data for the image frame to the content database 124 one row at a time. For example, the camera 122 transmits the image data for a row after the image data for the row is captured. The camera 122 can simultaneously capture image data and transmit image data.

The content database 124 receives image data for an image frame from the camera 122 and stores received image data. The image data can be stored in a raw image format (e.g., .raw, .cr2, .nef, .sr2, etc.) or in an encoded format (e.g., .jpg, .png, .tif, etc.). The image data stored in the content database 124 can include timestamps. In one embodiment, the content database 124 receives image data for all the rows of the image frame at one instant in time. In another embodiment, the content database 124 receives image data for the image frame one row at a time.

The motion sensors 126 capture motion sensor data and transmit the captured motion sensor data to the motion sensor database 128. The motion sensors 126 capture the motion sensor data describing movement of the device 100 as a function of time. The motion sensors 126 provide a timestamp for the captured motion sensor data. The motion sensors 126 can continually capture motion sensor data at an update frequency. The update frequency for capturing motion sensor data is typically a much higher frequency than the rate at which the row-by-row image data is captured, such that there are many data points of motion sensor data during the time that the camera captures one row. Specifically, the motion sensors 126 capture motion sensor data while the camera 122 captures image data for an image frame. The motion sensors 126 can include one or more magnetometers (compasses), gyroscopes, and accelerometers, among other sensitive devices for capturing motion of an object. In one embodiment, the motion sensors 126 continually transmit motion sensor data to the motion sensor database 128 as the motion sensor data is captured. In another embodiment, the motion sensors 126 transmit motion sensor data to the motion sensor database 128 in blocks, each block including motion sensor data over a period of time.

The motion sensor database 128 receives motion sensor data from the motion sensors 126 and stores the received motion sensor data. The capture module 120 can filter the motion sensor data before storing the motion sensor data in the motion sensor database 128. Example filtering operations include the application of a Kalman filter, a Gaussian smoothing filter, mean filtering, and median filtering. In one embodiment, the motion sensor database 128 continually receives motion sensor data from the motion sensors 126. In another embodiment, the motion sensor database 128 receives motion sensor data in blocks, each block including motion sensor data over a period of time.

In some embodiments, the content database 124 and the motion sensor database 128 synchronize the captured image data with the captured motion sensor data based on timestamps associated with the captured image data and the captured motion sensor data. The synchronization can include associating timestamps of the motion sensor data stored in the motion sensor database 128 with timestamps of the image data stored in the content database 124. For example, the motion sensor data captured at a time at which a row of an image frame is captured can be identified by querying the motion sensor database 128 with the time of capture of the row of the image frame to identify motion sensor data captured at the identified time. The identified motion sensor data can be subsequently associated with the row of the image frame and subsequent motion sensor data can be associated with subsequent rows of the image frame. In another example, the camera 122 transmits a signal to the motion sensors 126 when the camera 122 begins capturing each row of an image frame. The motion sensors 126 can insert a marker in the captured motion sensor data indicating the beginning of each row of the image frame. In some embodiments, motion sensor data associated with an image frame can be stored as metadata within an image file or container, or can be associated with an image frame identifier identifying the image frame.

IB. Processing Module

The processing module 130 processes and adjusts image data of an image frame captured by the capture module 120 to generate an adjusted image frame. The processing module 130 includes a motion estimation module 132 and an adjustment module 134.

The motion estimation module 132 estimates movement of the device 100 during capture of an image frame. Specifically, the motion estimation module 132 determines if, how much, and in what direction the device 100 moved as the image frame was captured, which may include discrete movement information for each row of the image frame. The motion estimation module 132 accesses the image data stored in the content database 124 and the motion sensor data stored in the motion sensor database 128 and synchronizes the image data and the motion sensor data, if not already synchronized.

The motion estimation module 132 determines if the device 100 moved while the camera 122 captured an image frame by analyzing the motion sensor data stored in the motion sensor database 128 corresponding to the image frame stored in the content database 124. To determine if the device 100 moved while the camera 122 captured the image data of the image frame, a constant threshold stability value can be used for each of dimension of each motion sensor of the motion sensors 126. Examples of motion sensor dimensions include translation and rotation along any axis. If a change in motion sensor data over a predetermined period of time of a threshold number of the motion sensor dimensions is below a threshold stability value for each dimension, the motion estimation module 132 determines the device 100 did not move while the camera 122 captured the image data of the image frame. If the change in motion sensor data over a predetermined period of time of a threshold number of the motion sensor dimensions is greater than a threshold stability value for each dimension, the motion estimation module 132 determines the device 100 did move while the camera 122 captured the image data of the image frame. The predetermined period of time can be, for example, a difference between a time the camera 122 begins to capture a current row of the image frame and a time the camera 122 begins to capture a next row of the image frame, the next row subsequently following the current row.

If the motion estimation module 132 determines the device 100 moved during capturing of the image frame (i.e., if the change in motion sensor data over a predetermined period of time of a threshold number of the motion sensor dimensions is greater than a threshold stability value for each dimension), the motion estimation module 132 determines motion vectors describing the movement of the device 100. The motion vectors are based on the motion sensor data stored in the motion sensor database 128. The motion vectors describe the motion of the device 100 as a function of change of motion sensor data for each row of the image frame. Specifically, the motion vectors describe how much and in what direction the device 100 moved during capturing of the image frame. In other words, the motion vectors provide a motion estimate of the device 100. To determine the motion vectors, the motion estimation module 132 may integrate the motion or acceleration of the device, as reflected in the motion sensor data, relative to the previous row. Other motion estimation techniques may also be used on the sensor data to determine the motion vectors.

The adjustment module 134 adjusts the image data of the image frame captured by the camera 122 and stored in the content database 124 based on the motion vectors determined by the motion estimation module 132. The adjustment module 134 calculates an image data translation for each row of the image frame based on the motion vectors determined by the motion estimation module 132. The image data translation indicates how much and in what direction image data of a row of the image frame is to be translated. In one example, the motion vectors determined by the motion estimation module 132 indicate the device 100 moved down between a timestamp the camera 122 began to capture image data for a previous row and a timestamp the camera 122 began to capture image data for a current row. The adjustment module 134 calculates an image data translation for the current row indicating the image data of the current row is to be translated by one row in the downward direction.

The adjustment module 134 adjusts image data of a row of the image frame, and image data of all subsequent rows of the image frame, based on the calculated image data translation of the row to generate an adjusted image frame. Continuing the example, the adjustment module 134 adjusts the image data of the image frame based on the image data translation of the current row by shifting the image data of the current row and all subsequent rows downward by one row thereby producing an adjusted image frame. The adjustment module 134 inserts an additional row (i.e., a blank row) between the previous row and the current row. The adjusted image frame includes an additional row than the image frame captured by the camera 122. In addition to upwards or downwards movement, the image translation may move the row in any direction in the adjusted image frame.

In adjusting the rows, a moved row may leave a blank space, or may be moved to a location for which there is already image data in the adjusted image frame. To account for these discrepancies, when the image data leaves a blank space, the subsequent row may be used to fill that gap, or the surrounding image data may be used to fill that location. In addition, a previous frame in a sequence of frames (e.g., in a video) may be accessed to add the data from that row of the previous frame. These techniques may be used, or not used, depending on the amount of motion. For example, if the amount of motion exceeds a threshold, a previous frame may not be used, as it may be difficult to reliably determine the frame to use for the present frame.

II. Example Image Capture—No Movement

Figure 2A:
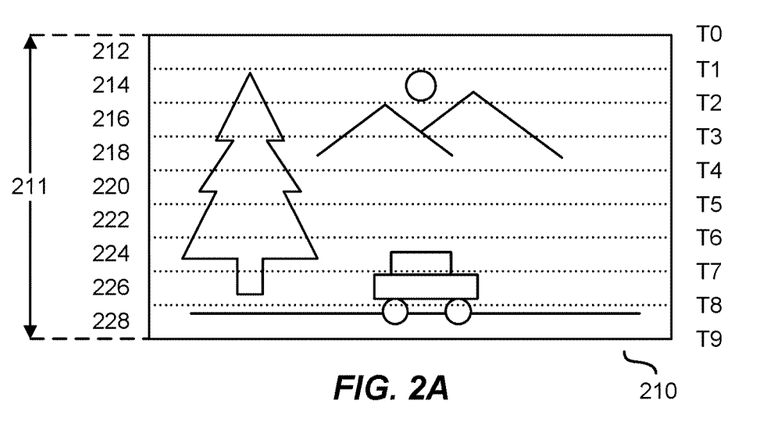
FIG. 2A illustrates an image frame including no distortion, according to a one embodiment.

FIG. 2A illustrates an image frame 210 captured by the camera 122 with the device 100 not moving, according to one embodiment. The camera 122 captures image data for the image frame 210 sequentially from row 212 through row 228. For illustration, each row of the rows 212 through 228 is more than one pixel in height. The image frame 210 has height 211, where the height 211 is the sum of the height of each row of the rows 212 through 228 of the image frame 210.

The camera 122 provides a timestamp when the camera 122 begins capturing image data for each of the rows 212 through 228 of the image frame 210 as well as when the camera 122 completes capturing image data for a last row 228 of the image frame 210. The timestamp T0 indicates a time the camera 122 began capturing image data for row 212 and the timestamp T9 indicates a time the camera 122 completed capturing image data for row 228.

Figure 2B:
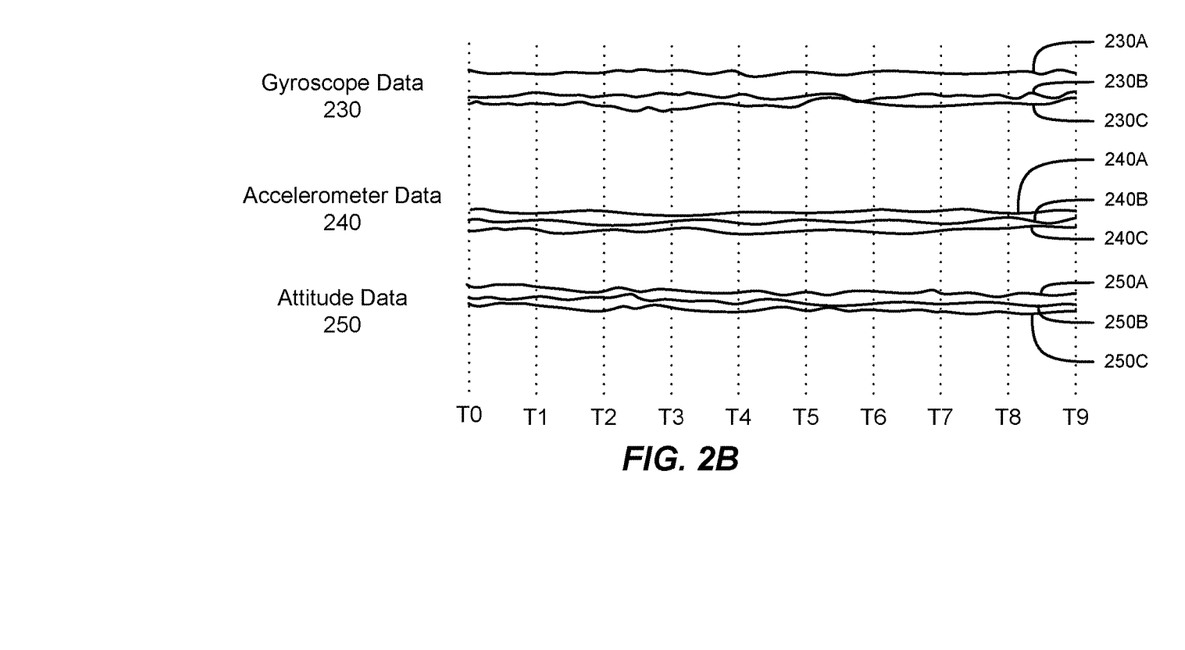
FIG. 2B illustrates various motion sensor data and attitude data for the image frame of FIG. 2A, according to one embodiment.

FIG. 2B illustrates various motion sensor data and attitude data captured by the motion sensors 126 corresponding to the image frame 210 of FIG. 2A captured by the camera 122, according to one embodiment. Variations in the gyroscope data 230, accelerometer data 240, and derived attitude data 250 illustrate movement of the device 100 during capture of the image frame 210 by the camera 122. 230A, 230B, and 230C represent gyroscope data for each of the X-, Y-, and Z-dimensions, respectively. 240A, 240B, and 240C represent accelerometer data for each of the X-, Y-, and Z-dimensions, respectively. 250A, 250B, and 250C represent attitude data for each of the X-, Y-, and Z-dimensions, respectively. Attitude data 250 represents angular deviations of the motion sensors in each of the dimensions (e.g., X-, Y-, and Z-dimensions).

The change in motion sensor data over a predetermined period of time measured for each dimension of each of the gyroscope data 230, accelerometer data 240, and attitude data 250 is below a threshold stability value for each dimension; accordingly, the motion estimation module 132 determines the device 100 did not move while the camera 122 captured the image data of the image frame 210.

III. Example Image Captures—with Movement and Correction

Figure 3A:
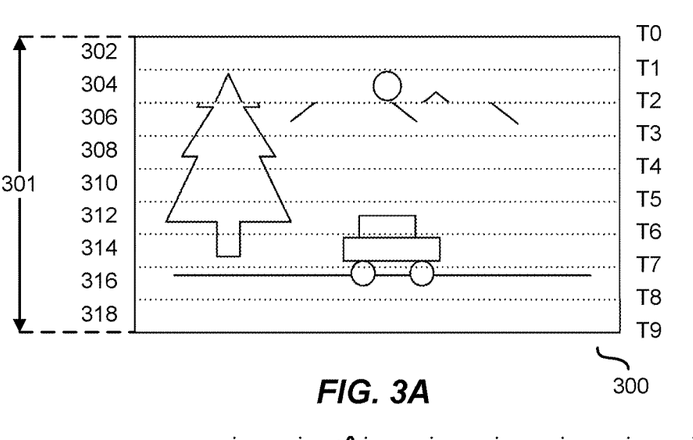
FIG. 3A illustrates an image frame including distortion, according to one embodiment.

FIG. 3A illustrates an image frame 300 captured by the camera 122 with the device 100 moving during the capture of the image frame 300, according to one embodiment. The camera 122 captures image data for the image frame 300 sequentially from row 302 through row 318. For illustration, each row of the rows 302 through 318 is more than one pixel in height. The image frame 300 has height 301, where the height 301 is the sum of the height of each row of the rows 302 through 318 of the image frame 300.

The camera 122 provides a timestamp when the camera 122 begins capturing image data for each of the rows 302 through 318 of the image frame 300 as well as when the camera 122 completes capturing image data for a last row 318 of the image frame 300. The timestamp T0 indicates a time the camera 122 began capturing image data for row 302 and the timestamp T9 indicates a time the camera 122 completed capturing image data for row 318.

Figure 3B:
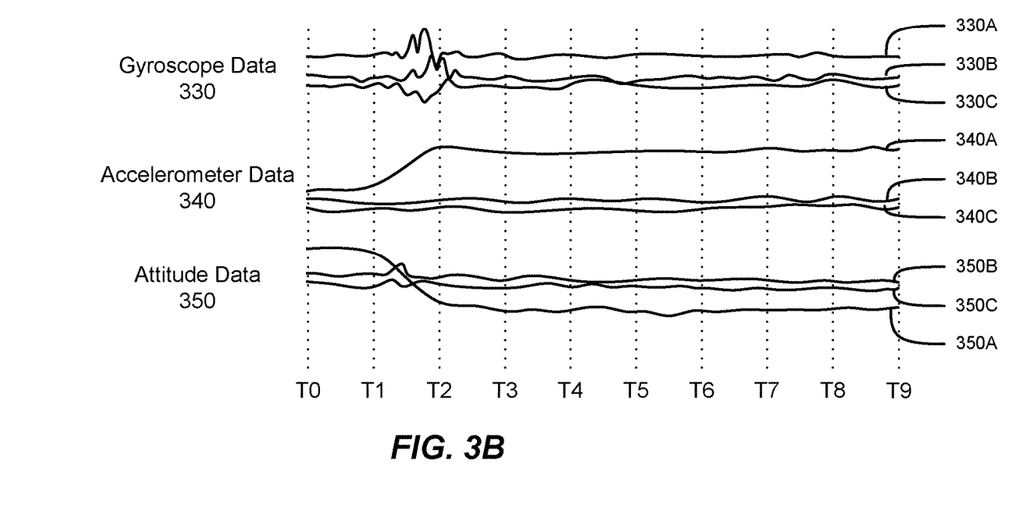
FIG. 3B illustrates various motion sensor data and attitude data corresponding to the image frame of FIG. 3A, according to one embodiment.

FIG. 3B illustrates various motion sensor data and attitude data captured by the motion sensors 126 corresponding to the image frame 300 of FIG. 3A captured by the camera 122, according to one embodiment. Variations in the gyroscope data 330, accelerometer data 340, and derived attitude data 350 illustrate movement of the device 100 during capture of the image frame 300 by the camera 122. 330A, 330B, and 330C represent gyroscope data for each of the X-, Y-, and Z-dimensions, respectively. 340A, 340B, and 340C represent accelerometer data for each of the X-, Y-, and Z-dimensions, respectively. 350A, 350B, and 350C represent attitude data for each of the X-, Y-, and Z-dimensions, respectively.

The change in motion sensor data over a predetermined period of time measured for each dimension of each of the gyroscope data 330, accelerometer data 340, and attitude data 350 is greater than a threshold stability value for each dimension; accordingly, the motion estimation module 132 determines the device 100 moved while the camera 122 captured the image data of the image frame 300. Specifically, the motion sensor data over a period of time between a timestamp T1 and a timestamp T2 is greater than a threshold stability value for 330A, 330B, and 330C for the gyroscope data, 340A for the accelerometer data 340, and 350A for the attitude data 350 are greater than a threshold stability value for the respective dimensions. The motion estimation module 132 further determines motion vectors describing the movement of the device 100 based on the change in motion sensor data 330A, 330B, 330C, 340A, and 350A. The motion vectors describe the motion of the device 100 as moving downward over the period of time between T1 and T2.

Figure 3C:
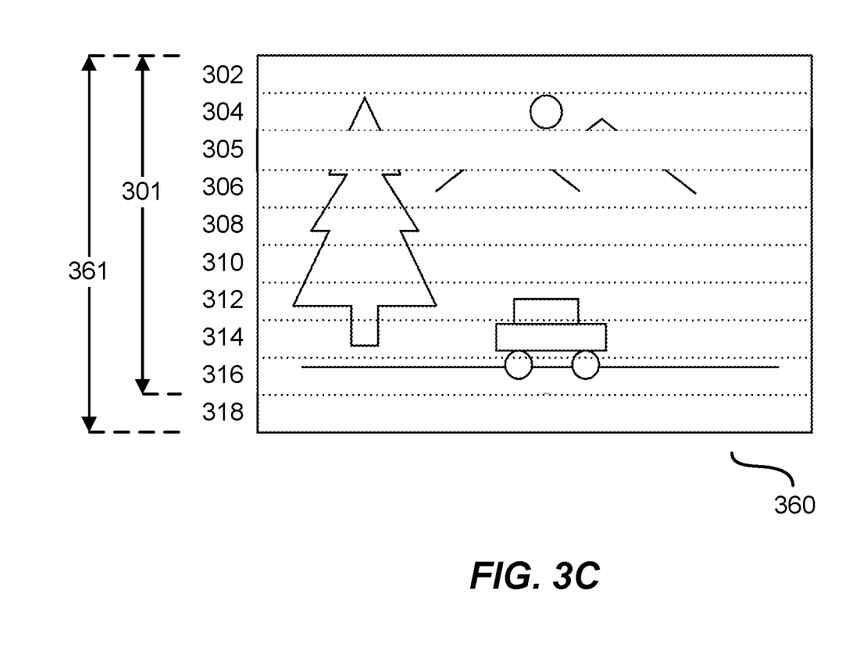
FIG. 3C illustrates an image frame adjusted based on the motion sensor data of FIG. 3B, according to one embodiment.

FIG. 3C illustrates an adjusted image frame 360 produced based on the motion sensor data of FIG. 3B, according to one embodiment. The adjustment module 134 calculates an image data translation for row 306 of the image frame 300 based on the motion vectors. The image data translation for row 306 indicates row 306 is to be translated by one row in the downward direction. The adjustment module 134 adjusts the image data of row 306 and subsequent rows 308 through 318 based on the calculated image data translation for row 306. The adjustment module 134 adjusts the image data of the image frame 300 by shifting rows 306 through 318 downward by one row thereby generating an adjusted image frame 360. The adjustment module 134 inserts an additional row, row 305, between row 304 and row 306. The adjusted image frame 360 has height 361, where height 361 is the number of rows of the adjusted image frame 360. Height 361 is greater than height 301 indicating the adjusted image frame 360 includes an additional row than the image frame 300.

Figure 4A:
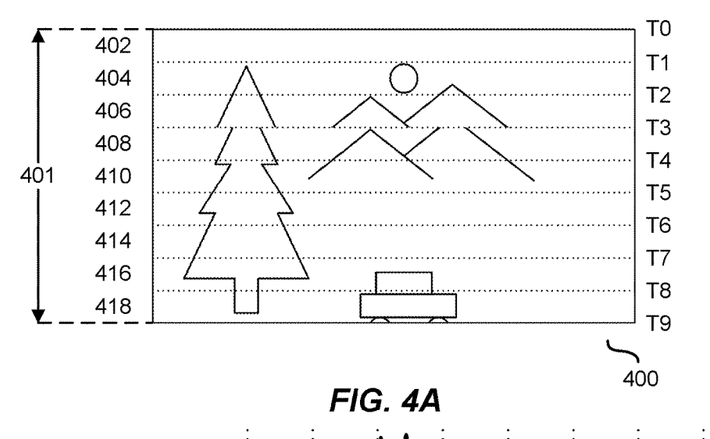
FIG. 4A illustrates an image frame including distortion, according to another embodiment.

Similarly, FIG. 4A illustrates an image frame 400 captured by the camera 122 with the device 100 moving during the capture of the image frame 400, according to one embodiment. The camera 122 captures image data for the image frame 400 sequentially from row 402 through row 418. For illustration, each row of the rows 402 through 418 is more than one pixel in height. The image frame 400 has height 401, where the height 401 is the sum of the height of each row of the rows 402 through 418 of the image frame 400. The timestamp T0 indicates a time the camera 122 began capturing image data for row 402 and the timestamp T9 indicates a time the camera 122 completed capturing image data for row 418.

Figure 4B:
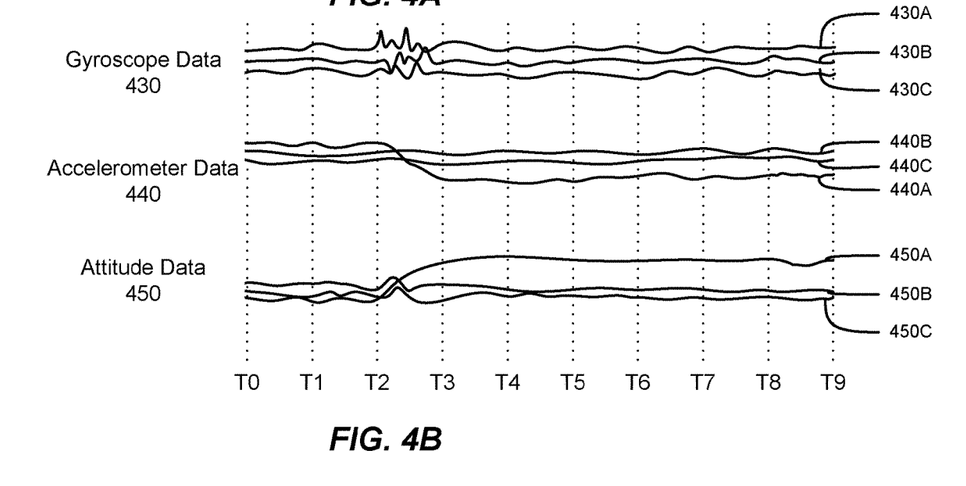
FIG. 4B illustrates various motion sensor data and attitude data corresponding to the image frame of FIG. 4A, according to one embodiment.

FIG. 4B illustrates various motion sensor data and attitude data captured by the motion sensors 126 corresponding to the image frame 400 of FIG. 4A captured by the camera 122, according to one embodiment. Variations in the gyroscope data 430, accelerometer data 440, and derived attitude data 450 illustrate movement of the device 100 during capture of the image frame 400 by the camera 122. 430A, 430B, and 430C represent gyroscope data for each of the X-, Y-, and Z-dimensions, respectively. 440A, 440B, and 440C represent accelerometer data for each of the X-, Y-, and Z-dimensions, respectively. 450A, 450B, and 450C represent attitude data for each of the X-, Y-, and Z-dimensions, respectively.

The motion sensor data over a period of time between a timestamp T2 and a timestamp T3 is greater than a threshold stability value for 430A, 430B, and 430C for the gyroscope data, 440A for the accelerometer data 440, and 450A for the attitude data 450 are greater than a threshold stability value for the respective dimensions. The motion estimation module 132 further determines motion vectors describing the movement of the device 100 based on the change in motion sensor data 430A, 430B, 430C, 440A, and 450A. The motion vectors describe the motion of the device 100 as moving upward over the period of time between T2 and T3.

Figure 4C:
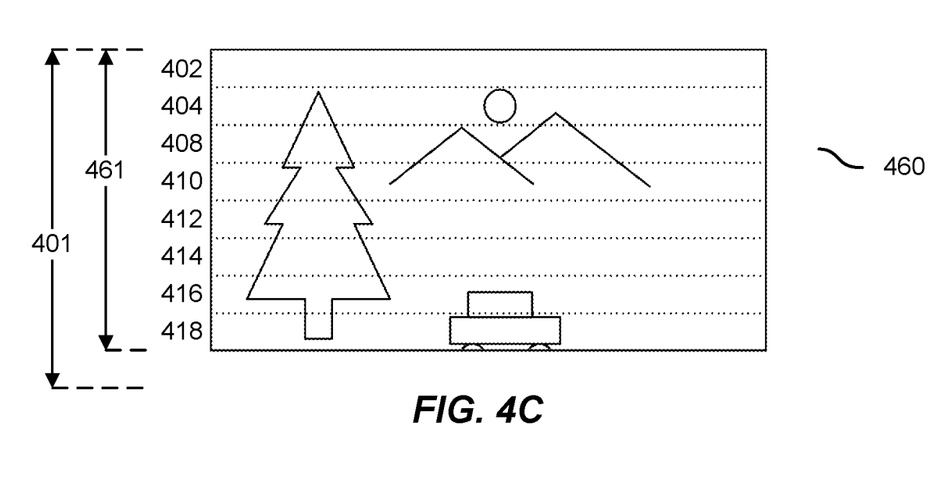
FIG. 4C illustrates an image frame adjusted based on the motion sensor data of FIG. 4B, according to one embodiment.

FIG. 4C illustrates an adjusted image frame 460 produced based on the motion sensor data of FIG. 4B, according to one embodiment. The adjustment module 134 calculates an image data translation for row 408 of the image frame 400 based on the motion vectors. The image data translation for row 408 indicates row 408 is to be translated by one row in the upward direction. The adjustment module 134 adjusts the image data of row 408 and subsequent rows 410 through 418 based on the calculated image data translation for row 408. The adjustment module 134 adjusts the image data of the image frame 400 by shifting rows 408 through 418 upward by one row thereby generating an adjusted image frame 460. The adjustment module 134 removes a row, row 406, before shifting rows 408 through 418 upward. The adjusted image frame 360 has height 461, where height 461 is the number of rows of the adjusted image frame 460. Height 461 is less than height 401 indicating the adjusted image frame 460 includes one fewer row than the image frame 400.

IV. Process for Adjusting Image Data

Figure 5:
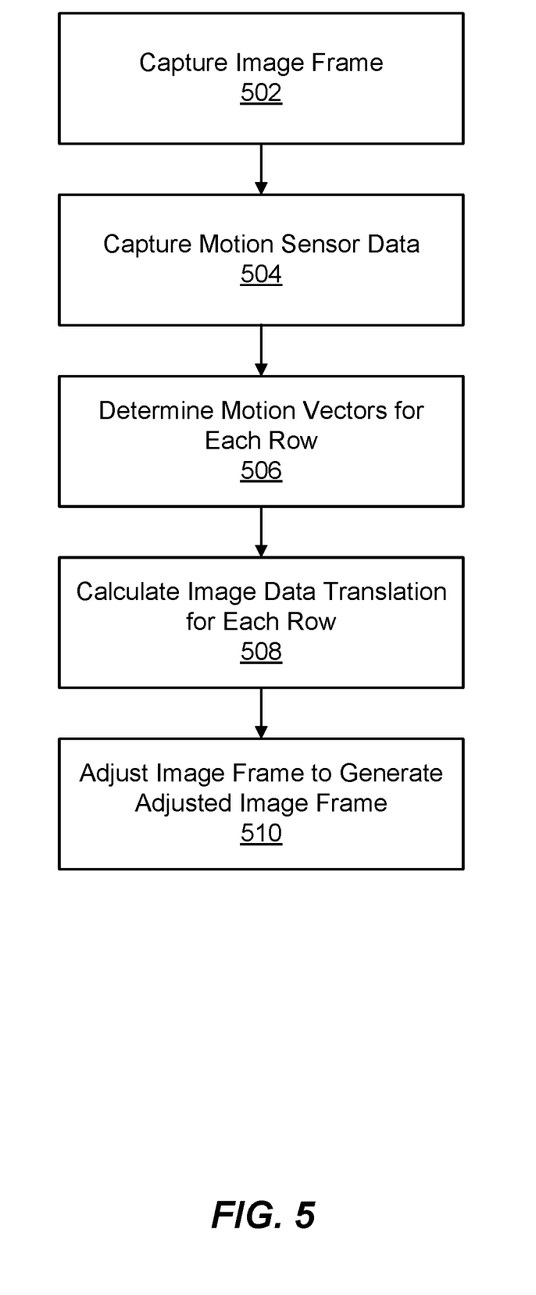
FIG. 5 is a flow chart of a method for adjusting an image frame based on motion sensor data, according to one embodiment.

FIG. 5 is a flow chart of a method for adjusting an image frame based on motion sensor data, according to one embodiment. The camera 122 captures 502 an image frame and transmits the image frame to the content database 124. Similarly, the motion sensors 126 capture 504 motion sensor data and transmit the motion sensor data to the motion sensor database 128. The motion estimation module 132 determines 506 motion vectors describing motion of the device 100 as a function of the change of motion sensor data for each row of the image frame. The adjustment module 134 calculates 508 an image data translation for each row of the image frame based on the motion vectors determined by the motion estimation module 132. The adjustment module 134 adjusts 510 the image frame based on the calculated image data translation of each row of the image frame to generate an adjusted image frame.

Upon reading this disclosure, those of skill in the art will appreciate still additional alternative structural and functional designs for a system and a process for motion-based content navigation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, can be made in the arrangement, operation and details of the method and apparatus disclosed herein without departing from the spirit and scope defined in the appended claims.

What is claimed is:
1. A method comprising:
 capturing an image frame by an image capture device, the image frame including image data for all of the plurality of rows of the image frame captured by the image capture device, the image data captured sequentially row-by-row, wherein capturing the image frame comprises providing a timestamp for each row of the plurality of rows;

capturing motion sensor data corresponding to the image frame, wherein capturing the motion sensor data comprises providing a timestamp for the motion sensor data;

determining motion vectors based on the motion sensor data, the motion vectors describing motion between each row of the plurality of rows of the image frame;

calculating an image data translation for each row of the plurality of rows based on the motion vector for the row; and adjusting the image frame based on the image data translation for each row of the plurality of rows to generate an adjusted image frame.

2. The method of claim 1 further comprising synchronizing the image frame and motion sensor data based on the timestamp of one or more rows of the plurality of rows and the timestamp of the motion sensor data.

3. The method of claim 1, further comprising identifying that the motion sensor data varies above a threshold stability; and wherein determining the motion vectors is performed responsive to the identifying that the motion sensor data varies above the threshold stability.

4. The method of claim 1, wherein the image data translation for each row describes an amount and a direction image data of the row is to be translated.

5. The method of claim 1, wherein adjusting the image frame comprises:

adjusting image data for a row and rows sequentially following the row based on the image data translation of the row.

6. The method of claim 5, wherein adjusting the image data for the row and the rows sequentially following the row comprises translating the image data for the row and the rows sequentially following the row.

7. A non-transitory computer-readable storage medium storing executable computer instructions that, when executed by a processor, cause the processor to perform steps comprising:

capturing an image frame by an image capture device, the image frame including image data for all of the plurality of rows of the image frame captured by the image capture device, the image data captured sequentially row-by-row, wherein capturing the image frame comprises providing a timestamp for each row of the plurality of rows;

capturing motion sensor data corresponding to the image frame, wherein capturing the motion sensor data comprises providing a timestamp for the motion sensor data;

determining motion vectors based on the motion sensor data, the motion vectors describing motion between each row of the plurality of rows of the image frame;

calculating an image data translation for each row of the plurality of rows based on the motion vector for the row; and adjusting the image frame based on the image data translation for each row of the plurality of rows to generate an adjusted image frame.

8. The non-transitory computer-readable storage medium of claim 7, wherein the instructions that, when executed by the processor, cause the processor to perform steps comprising synchronizing the image frame and motion sensor data based on the timestamp of one or more rows of the plurality of rows and the timestamp of the motion sensor data.

9. The non-transitory computer-readable storage medium of claim 7, wherein the instructions that, when executed by the processor, cause the processor to perform steps comprising identifying that the motion sensor data varies above a threshold stability, and wherein determining the motion vectors is performed responsive to the identifying that the motion sensor data varies above the threshold stability.

10. The non-transitory computer-readably storage medium of claim 7, wherein the image data translation for each row describes an amount and a direction image data of the row is to be translated.

11. The non-transitory computer readable storage medium of claim 7, wherein adjusting the image frame comprises:

adjusting image data for a row and rows sequentially following the row based on the image data translation of the row.

12. The non-transitory computer readable storage medium of claim 11, wherein adjusting the image data for the row and the rows sequentially following the row comprises translating the image data for the row and the rows sequentially following the row.

13. A system comprising:

a non-transitory computer-readable storage medium storing executable computer instructions that, when executed, perform steps comprising:

capturing an image frame by an image capture device, the image frame including image data for all of the plurality of rows of the image frame captured by the image capture device, the image data captured sequentially row-by-row, wherein capturing the image frame comprises providing a timestamp for each row of the plurality of rows;

capturing motion sensor data corresponding to the image frame, wherein capturing the motion sensor data comprises providing a timestamp for each row of the plurality of rows;

determining motion vectors based on the motion sensor data, the motion vectors describing motion between each row of the plurality of rows of the image frame;

calculating an image data translation for each row of the plurality of rows based on the motion vector for the row; and adjusting the image frame based on the image data translation for each row of the plurality of rows to generate an adjusted image frame; and a processor configured to execute the computer instructions.

14. The system of claim 13, wherein the instructions that, when executed, perform steps comprising synchronizing the image frame and motion sensor data based on the timestamp of one or more rows of the plurality of rows and the timestamp of the motion sensor data.

15. The system of claim 13, wherein the instructions that, when executed, perform steps comprising identifying that the motion sensor data varies above a threshold stability, wherein determining the motion vectors is performed responsive to the identifying that the motion sensor data varies above the threshold stability.

16. The system of claim 13, wherein the image data translation for each row describes an amount and a direction image data of the row is to be translated.

17. The system of claim 13, wherein adjusting the image frame comprises:

adjusting image data for a row and rows sequentially following the row based on the image data translation of the row.

18. The system of claim 17, wherein adjusting the image data for the row and the rows sequentially following the row comprises translating the image data for the row and the rows sequentially following the row.

* * * * *

UNITED STATES PATENT AND TRADEMARK OFFICE
CERTIFICATE OF CORRECTION

PATENT NO. : 9,854,170 B2
APPLICATION NO. : 14/983430
DATED : December 26, 2017
INVENTOR(S) : Dov Katz et al.

Page 1 of 1

It is certified that error appears in the above-identified patent and that said Letters Patent is hereby corrected as shown below:

Column 10, Line 65, after "of" delete "the" and insert -- a --.
Column 11, Line 45, after "of" delete "the" and insert -- a --.
Column 12, Line 45, after "of" delete "the" and insert -- a --.

Signed and Sealed this
Fifth Day of June, 2018

Andrei Iancu
*Director of the United States Patent and Trademark Office*